(12) United States Patent
McCullough

(10) Patent No.: US 7,981,341 B2
(45) Date of Patent: Jul. 19, 2011

(54) METHOD AND APPARATUS FOR SCALED UP REPRODUCTION OF DETAILED FEATURES

(75) Inventor: Edward D. McCullough, Riverside, CA (US)

(73) Assignee: The Boeing Company, Chicago, IL (US)

( * ) Notice: Subject to any disclaimer, the term of this patent is extended or adjusted under 35 U.S.C. 154(b) by 1131 days.

(21) Appl. No.: 11/733,437

(22) Filed: Apr. 10, 2007

(65) Prior Publication Data

US 2008/0254238 A1    Oct. 16, 2008

(51) Int. Cl.
*B29C 33/40*    (2006.01)
(52) U.S. Cl. .................. 264/220; 264/222; 264/227
(58) Field of Classification Search ........... 264/219–227
See application file for complete search history.

(56) References Cited

U.S. PATENT DOCUMENTS

| | | | | |
|---|---|---|---|---|
| 2,952,094 A | * | 9/1960 | Ebel | 446/221 |
| 3,565,978 A | * | 2/1971 | Folger et al. | 264/1.34 |
| 4,814,412 A | * | 3/1989 | Crowther et al. | 528/28 |
| 5,051,451 A | * | 9/1991 | Moll et al. | 521/60 |
| 5,053,437 A | * | 10/1991 | Moll et al. | 521/98 |
| 5,852,248 A | * | 12/1998 | Chadwick | 75/228 |
| 5,852,766 A | * | 12/1998 | Chadwick et al. | 419/2 |
| 6,063,314 A | * | 5/2000 | Chadwick | 264/16 |
| 6,866,813 B1 | * | 3/2005 | Trubitt | 264/523 |
| 2005/0231071 A1 | * | 10/2005 | Magnussen et al. | 310/328 |
| 2008/0254238 A1 | * | 10/2008 | McCullough | 428/15 |

OTHER PUBLICATIONS

Henderson, Kevin J., NASA URETI "Biologically Inspired Materials" Grant No. NAG-1-23-1 Poster report Dec. 2005.

* cited by examiner

*Primary Examiner* — John R Lee
(74) *Attorney, Agent, or Firm* — Felix L. Fischer

(57) ABSTRACT

Producing a scaled multiple parallax compound lens is accomplished by providing an insect eye having multiple ommitidia and creating a polymer mold of the insect eye. A casting is then created from the polymer mold with an expandable polymer mold. A second casting is then created from the second polymer mold. Duplication of the process can be accomplished for further scaling up of the compound lens with the final casting created using a durable polymer having appropriate optical properties for the lens.

15 Claims, 11 Drawing Sheets

METHOD AND APPARATUS FOR SCALED UP REPRODUCTION OF DETAILED FEATURES

BACKGROUND

1. Technical Field

Embodiments of the disclosure relate generally to the field of scaled enlargement of microscopic surface features and more particularly to a method and apparatus for creating a multiple parallax visual sensor by copying and scaling of a compound insect eye lens.

2. Description of the Related Art

In their current state, robotic systems are unable to accomplish fully automated tasks in unstructured environments. No general purpose robot can navigate through obstructed or cluttered environments, pickup and manipulate objects, assemble components, repair broken systems or manipulate other systems with a high degree of precision with no touch labor. Despite the gains in structured environments such as pick and place machines, precision of a similar nature is not possible in a unstructured or unregistered environment with unregistered objects.

The lack of these kinds of capability in current robotics means that this functionality cannot be transferred to military applications in the form of robotic or artificial intelligence assistance to combat or logistics personnel. The unique problem associated with such devices is that robotic systems do not have a simplified method of collecting three dimensional situational information and quickly correlating it for use in solving mission problems. The ability to overcome this issue may allow, but is not limited to, precision close proximity operations between space and surface vehicles, robotic assembly of systems in unstructured environments to the degree required for productive space operations, autonomous vehicles capable of duplicating the manipulative abilities of humans and autonomous systems which can duplicate the navigation and mobility displayed by most animals.

Other methods of determining 3 D situational awareness include the use of single cameras with motion and image processing algorithms, the use of plenoptic cameras, and dual camera for single parallax. The first of these is the method used by pick and place machines. Current systems require very structured environments with pre registration of parts on perforated tape spools or similar approaches. Plenoptic cameras generate limited parallax and are not currently widely used in the desired types of applications since extensive algorithmic support is required. Dual cameras providing single parallax do not provide the level of capability that simplicity, functionality and reliability require for fully autonomous operations or geometric understanding of the position of a vehicle or device relative to a known or unknown environment or other device. Determination of the dynamics of a situation, the recognition of people or objects, and collection of enough parallax information to accomplish these tasks requires a method of collecting multiple parallax information.

Collecting this type of information may be accomplished via biomimetic vision systems like a compound eye. Current methods of fabricating devices which simulate compound eyes are either lacking in functionality or are too small to interface. An exemplary device fabricated by Dr Luke Lee (see K. Jeong, J. Kim, L. P. Lee, Polymeric Synthesis of Biomimetic Artificial Compound Eyes, Proc. Transducers, Seoul, Korea, pp. 1110-1114, Jun. 5-9, 2005, Inspirations from Biological Optics for Advanced Photonic Systems Luke P. Lee and Robert Szema, 18 Nov. 2005 VOL 310 SCIENCE, Biologically Inspired Artificial Compound Eyes, Ki-Hun Jeong, Jaeyoun Kim, Luke P. Lee, SCIENCE VOL 312 28 Apr. 2006) does not have foveae and therefore misses an important feature of compound eyes. A replication technique employed through a molding process by the University of North Carolina, as reported by Kevin J. Henderson under NASA URETI "Biologically Inspired Materials" Grant no. NAG-1-23-1 Poster report 12/2005, is difficult to effectively interface based on its very small size.

It is therefore desirable to produce variable size compound eyes with foveae to provide the desired multiple parallax vision capability.

It is further desirable to provide a process for production of such lens systems with high repeatability and non-complex processing.

SUMMARY

An exemplary method embodiments provides for producing a scale up of complex microscopic surface details, such as a multiple parallax compound lens, by providing a compound eye, such as an insect eye having multiple ommitidia, and creating a polymer mold of the insect eye. A casting is then created from the polymer mold with an expandable polymer which is then linearly expanded to provide a form for creating a second mold. A second casting is then created from the second polymer mold. Duplication of the process can be accomplished for further scaling up of the compound lens with the final casting created using a durable polymer having appropriate optical properties for the lens.

BRIEF DESCRIPTION OF THE DRAWINGS

The features and advantages of embodiments disclosed herein will be better understood by reference to the following detailed description when considered in connection with the accompanying drawings, including prior art from the University of North Carolina, wherein.

DETAILED DESCRIPTION

A method and apparatus are disclosed herein to create highly detailed scale up of microscopic surface features of an article. The specific embodiment provided in detail creates compound eyes which retain characteristics evolved in insect eyes but are large enough to simplify interfacing to conformal detector arrays. An insect head, which is approximately 3000 microns in diameter, is too small to interface to and to integrate into larger systems. As an example without limitation, the compound eye of a fly has thousands of simple eyes called ommitidia. These are on the order of 40 microns in diameter. The fine structures on the ommitidia are features approximately 250 nanometers in diameter and 30 nanometers high.

The process takes a representation (a cast), for instance without limitation, of a compound eye (or other small scale item) and scales it to successively larger sizes. An accurate mold of the compound or insect eye is made. A cast of the eye is made using a material which faithfully reproduces the features of the mold and is capable of expanding linearly when placed in a suitable solvent. The expanded cast eye is used to make an additional mold and the process is repeated to scale the eye to the required size. Expanding the size through four 3 X steps provides a scaling of the ommitidia of $3^4 \times 40$ microns=$81 \times 40$=3240 microns. In various embodiments, the final cast is made with a durable material since no further increases in size are needed.

For the example provided with four 3 X expansions ommitidia in the scaled up eye are approximately $\frac{1}{8}^{th}$ inch diameter. Their scale up resulting in comparable scale up of the height and section of fine features of $250 \times 81$=20,250 nanometers or 20.20 microns and $30 \times 81$=270 nanometers or 0.27 microns respectively. The fly's head will expand to 3,000 microns$\times 81$=253,000 microns or about 10 inches.

This is easily large enough to integrate the eye to detectors and macro scale products. As desired for a multiple foveal system each ommitidia will see an image of the environment with parallax to all the images from the other ommitidia. Multiple parallax visual information is then retrievable via the large scale compound eye lens set interfaced to a conformal detector array. The expansion of the lens set facilitates integration to detectors and integrating into systems.

Figure 1:
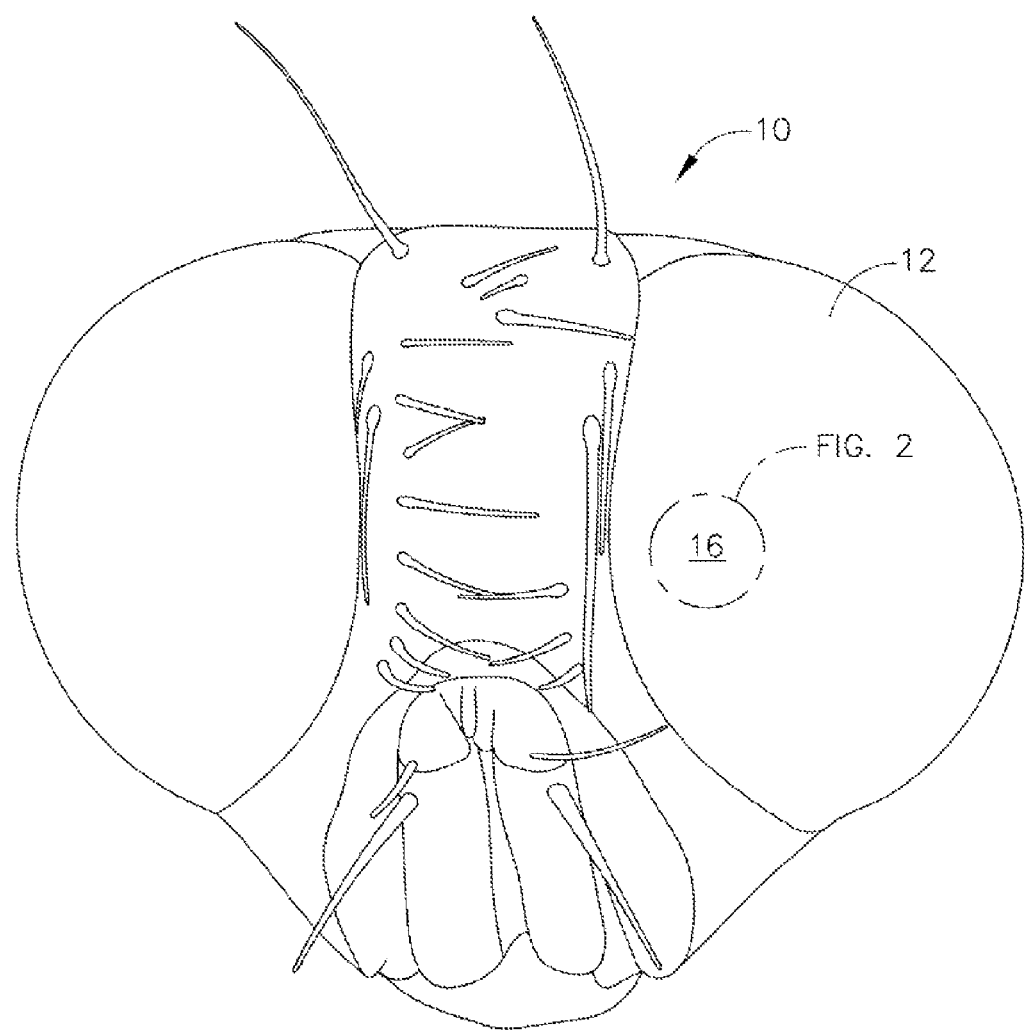
FIG. 1 is a depiction of the head of a fly having compound eyes with multiple ommitidia as photographed by the University of North Carolina and published in the referenced NASA poster report.
Figure 2:
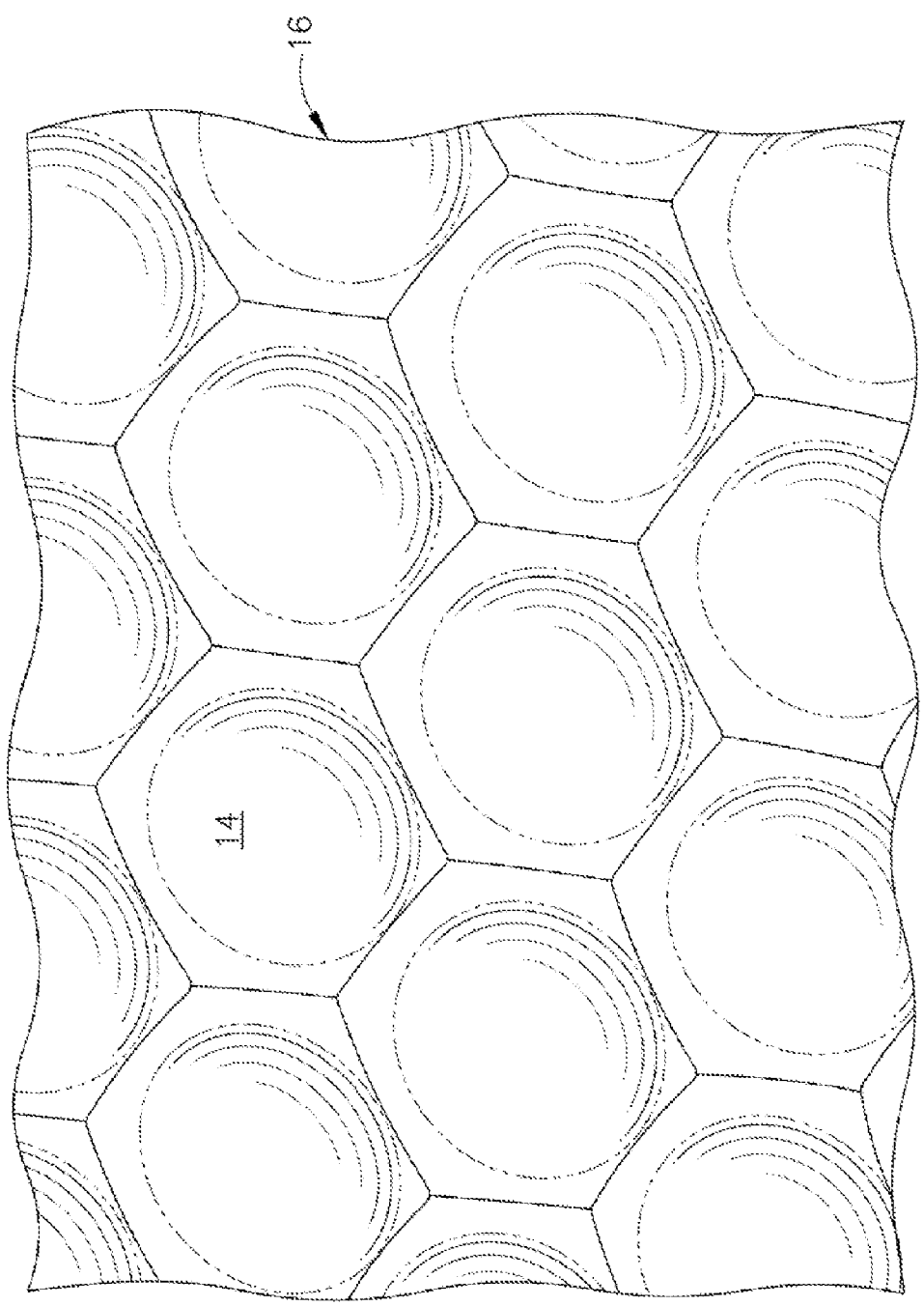
FIG. 2 is a representation of an expanded view of the ommitidia of the eye of FIG. 1 in the outlined expansion box.
Figure 3:
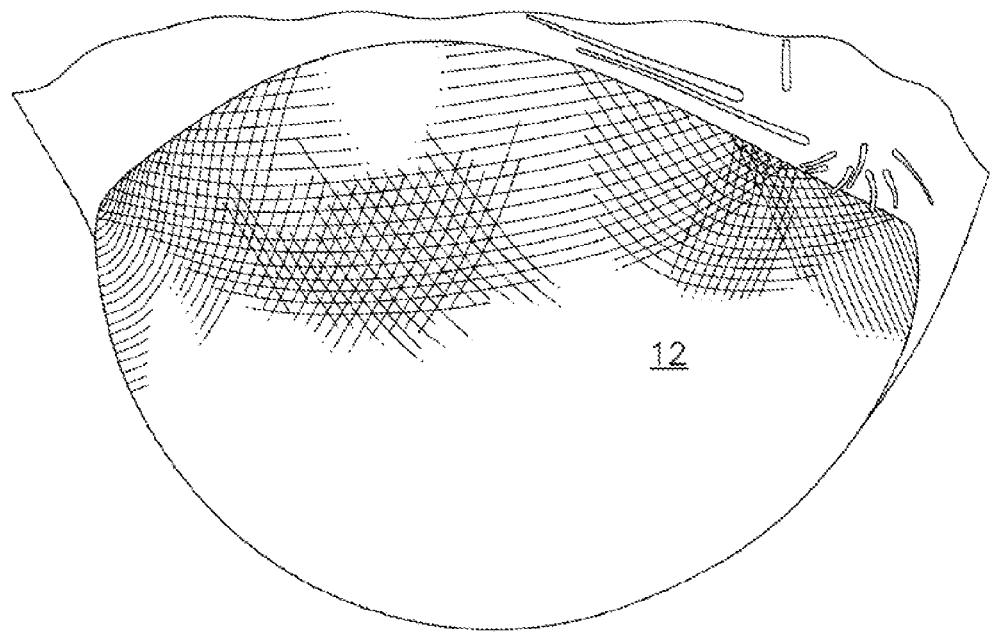
FIG. 3 is a representation of a scanning electron microscope view of the details of the eye of FIG. 1.
Figure 4:
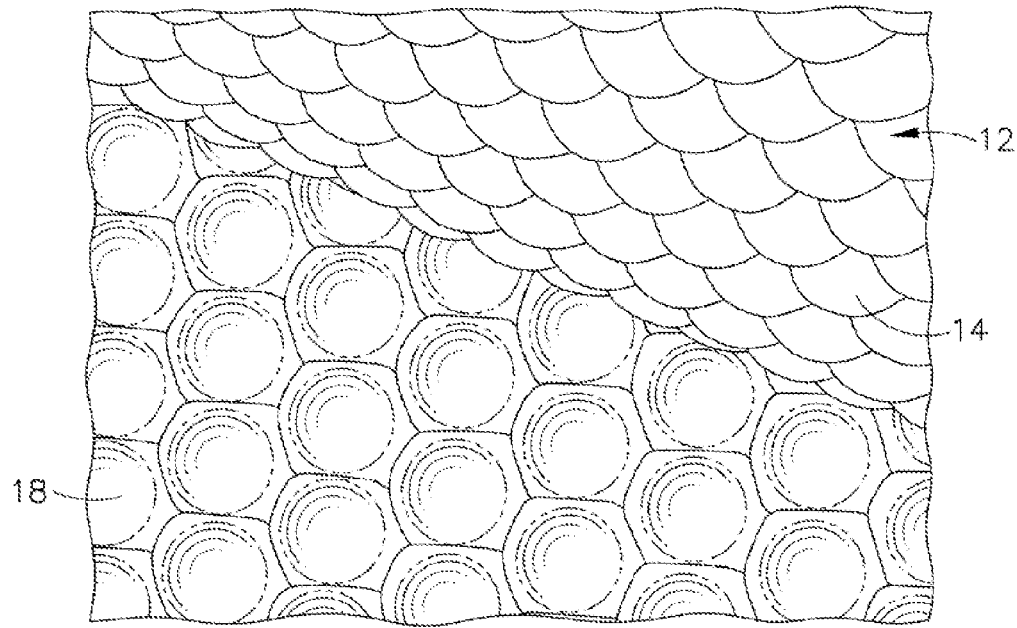
FIG. 4 is a representation of an SEM view of a mold layer being removed from the eye.
Figure 5:
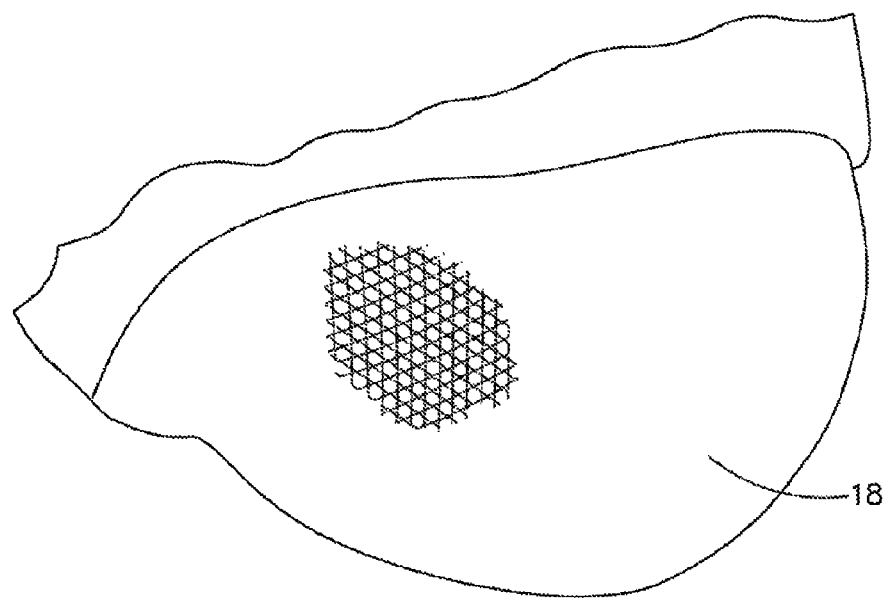
FIG. 5 is a representation of a SEM view of the mold.
Figure 6:
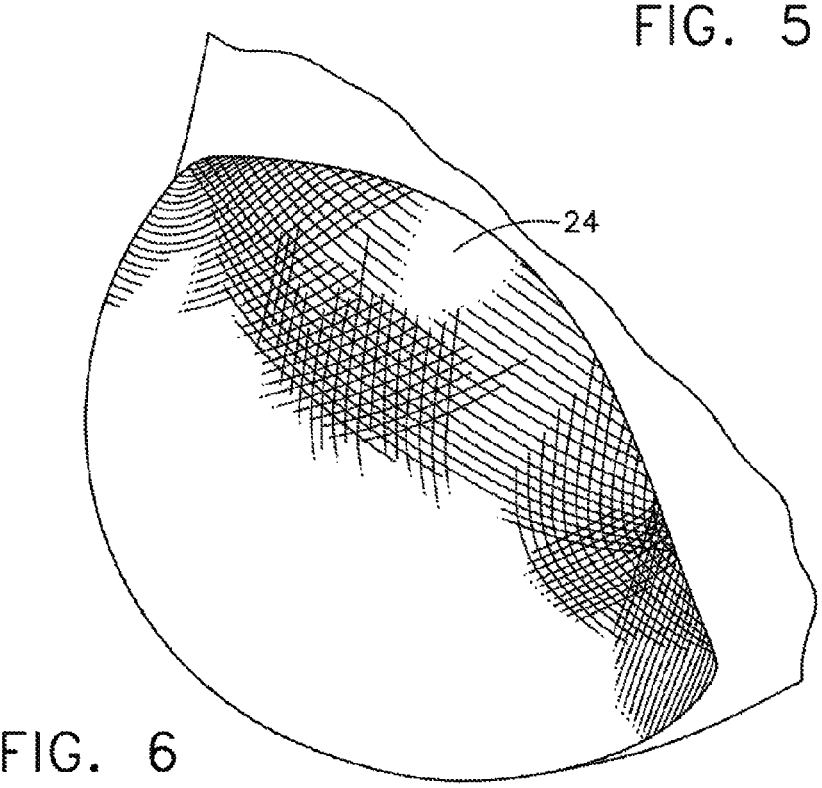
FIG. 6 is a representation of a SEM view of a casting made from the mold.

In an exemplary embodiment, the head of a fly 10 shown in FIG. 1 is used as the original item to be scaled. The fly's eyes 12 incorporate the multiple ommitidia 14 shown in the box 16 expanded in FIG. 2 wherein the contours of the multiple ommitidia are apparent. Detail of the eye is shown in the scanning electron microscope micrograph represented in FIG. 3. FIGS. 4, 5 and 6 show, in representative form, micrographs of an SEM view of a mold layer being removed from the eye, a representation of a SEM view of the interior surface of the resulting mold, and a representation of a SEM view of ommitidia details of a casting made from the mold.

Figure 7:
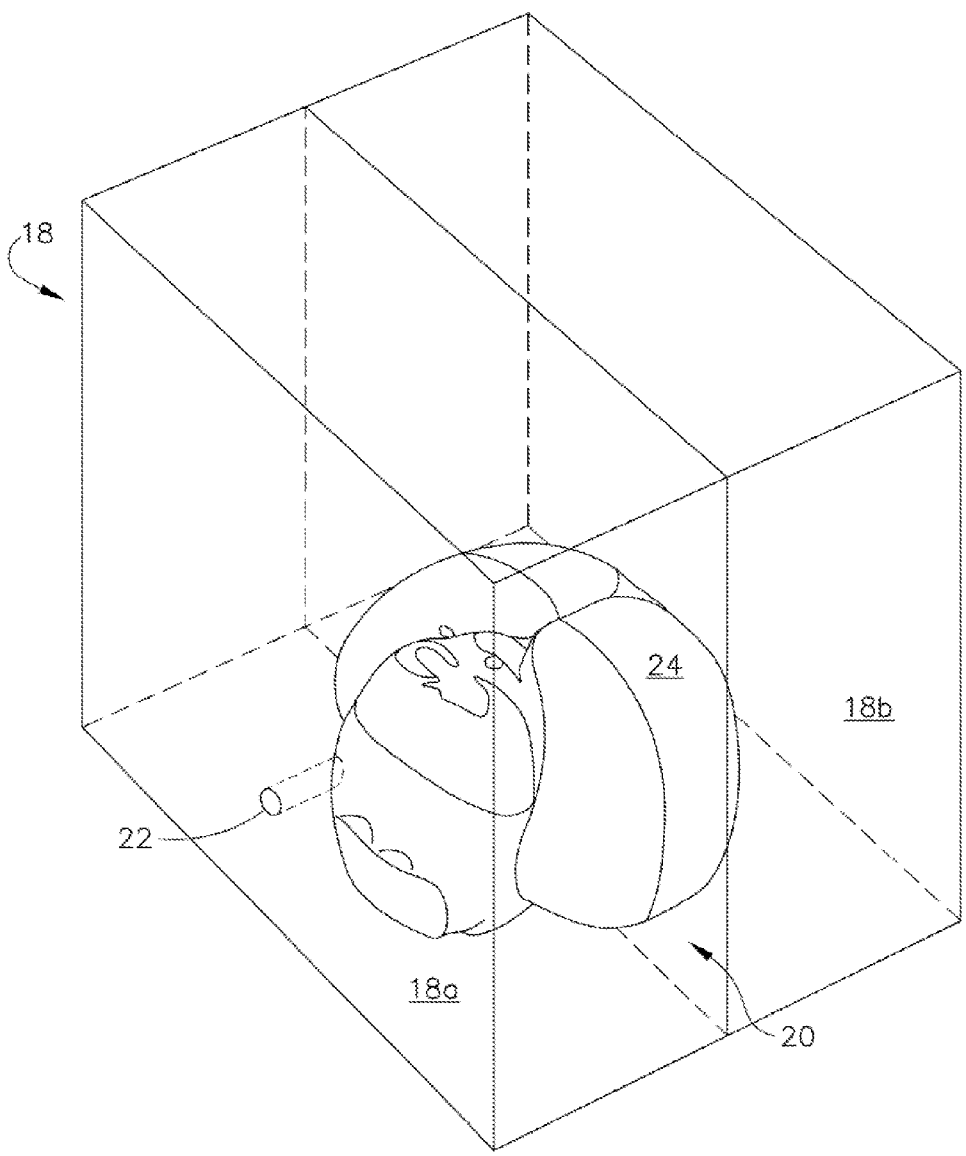
FIG. 7 is an exemplary mold arrangement for the original and successive molds employed in the process embodiments described herein.

FIG. 7 demonstrates an exemplary mold arrangement wherein a mold 18 is created by using a separation film 20 placed proximate a midline of the original eye or subsequent casting, as described subsequently, and a polymer box is created around the eye or casting separable at the film into two mold halves 18a and 18b. A casting fill port 22 is drilled or molded into one half of the mold for the embodiment shown for the subsequent casting process. The separation plane and location of the fill port are shown in the exemplary drawings in arbitrary positions for clarity of reference. In actual embodiments, the separation plane and the fill port are located in a manner to avoid interference with desired details of the casting.

Figure 8:
FIG. 8 is a representation of a casting created in the process as immersed in a container prior to solvent expansion.
Figure 9A:
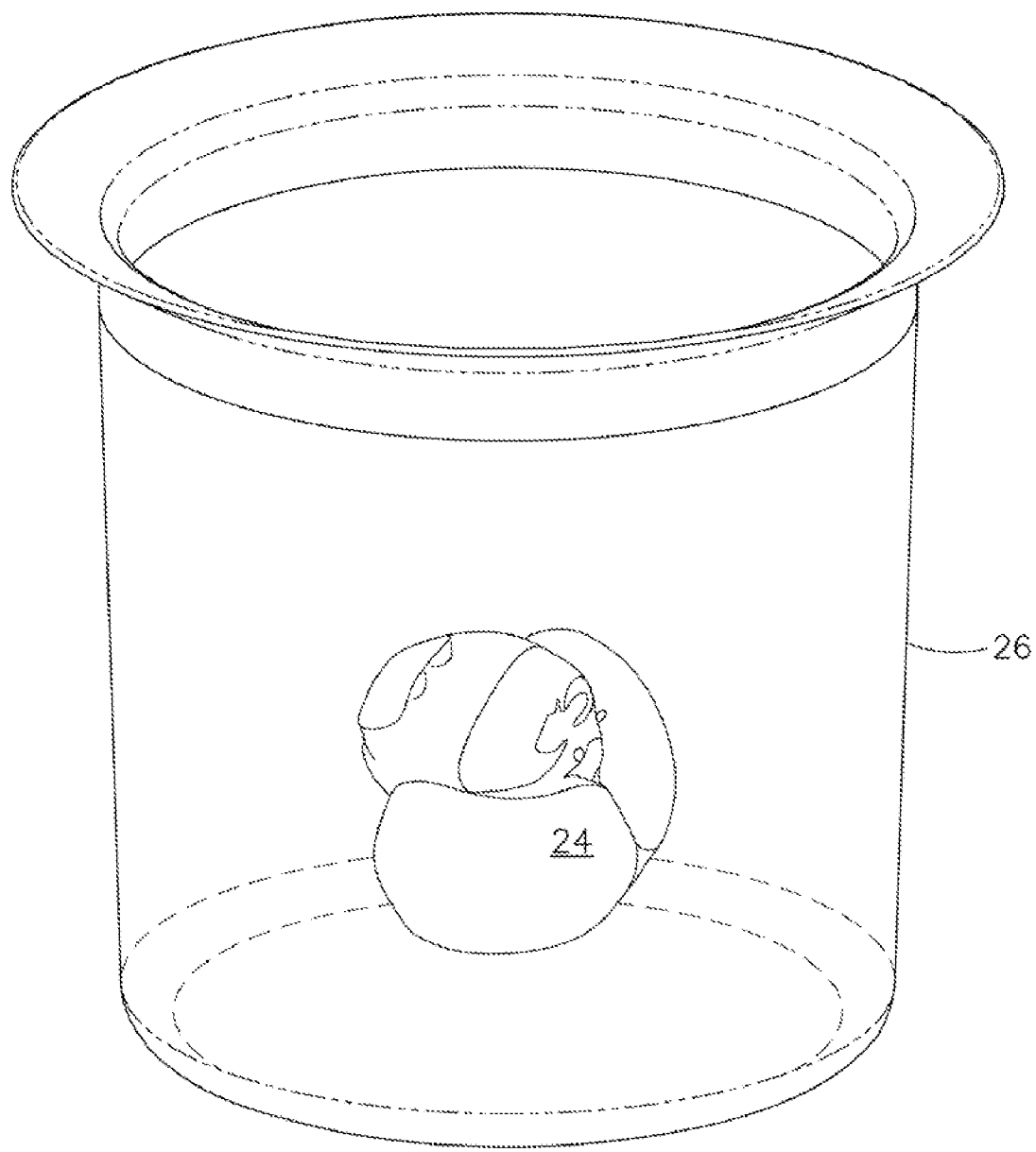
FIG. 9a is a representation of the casting and container of FIG. 8 after solvent expansion has occurred.
Figure 9B:
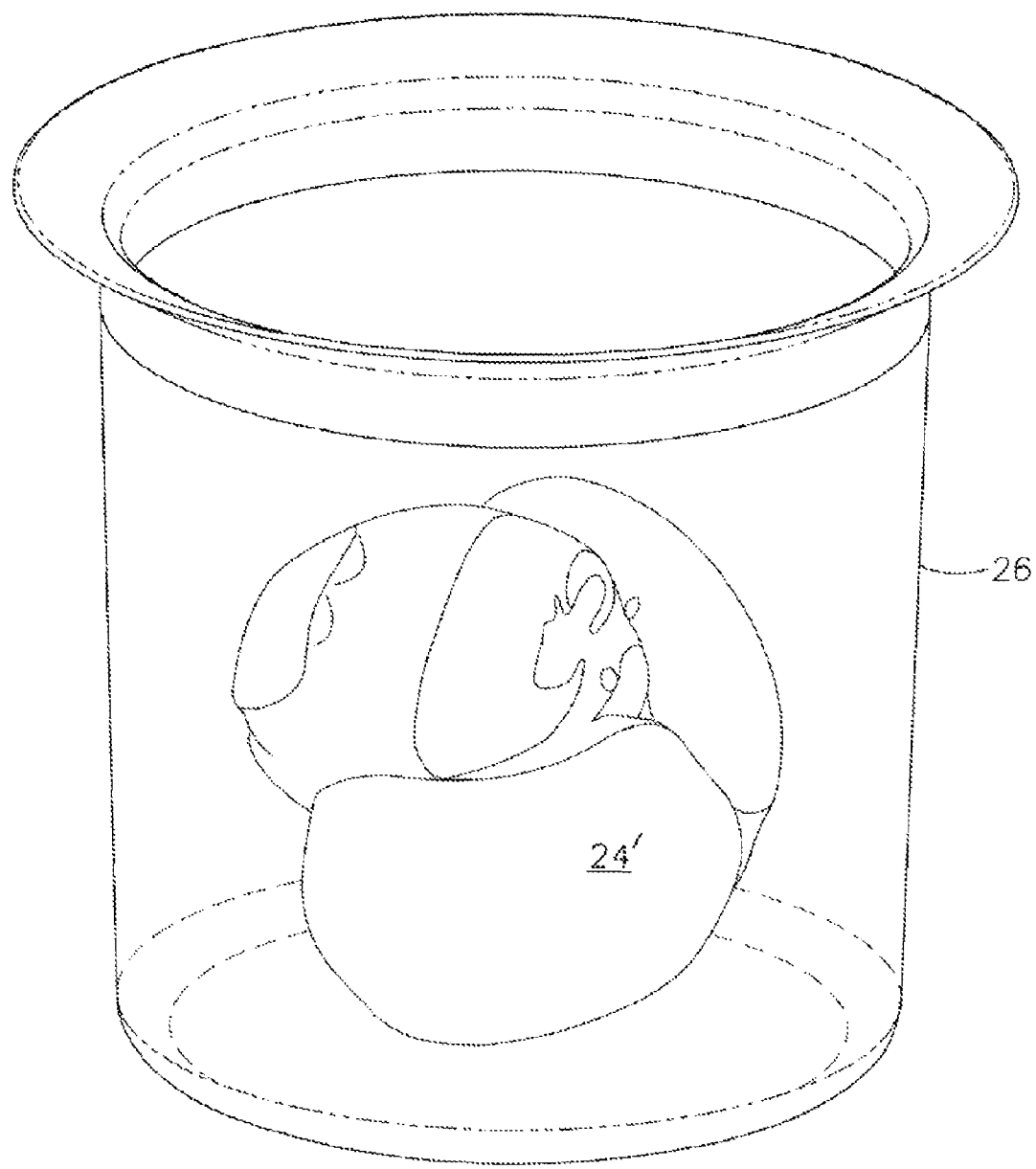

As shown in FIG. 8, a cast 24 of the exemplary fly head provides a first basis for the expansion process. The casting is inserted in an expansion vessel 26, such as beaker for the simplified embodiment shown, and a solvent is introduced for expansion of the polymer casting. The completed expansion is shown in FIG. 9b. As previously described, a 3 X expansion is exemplary with the representative size of the casting prior to and after expansion shown in the drawings not to scale.

Figure 10:
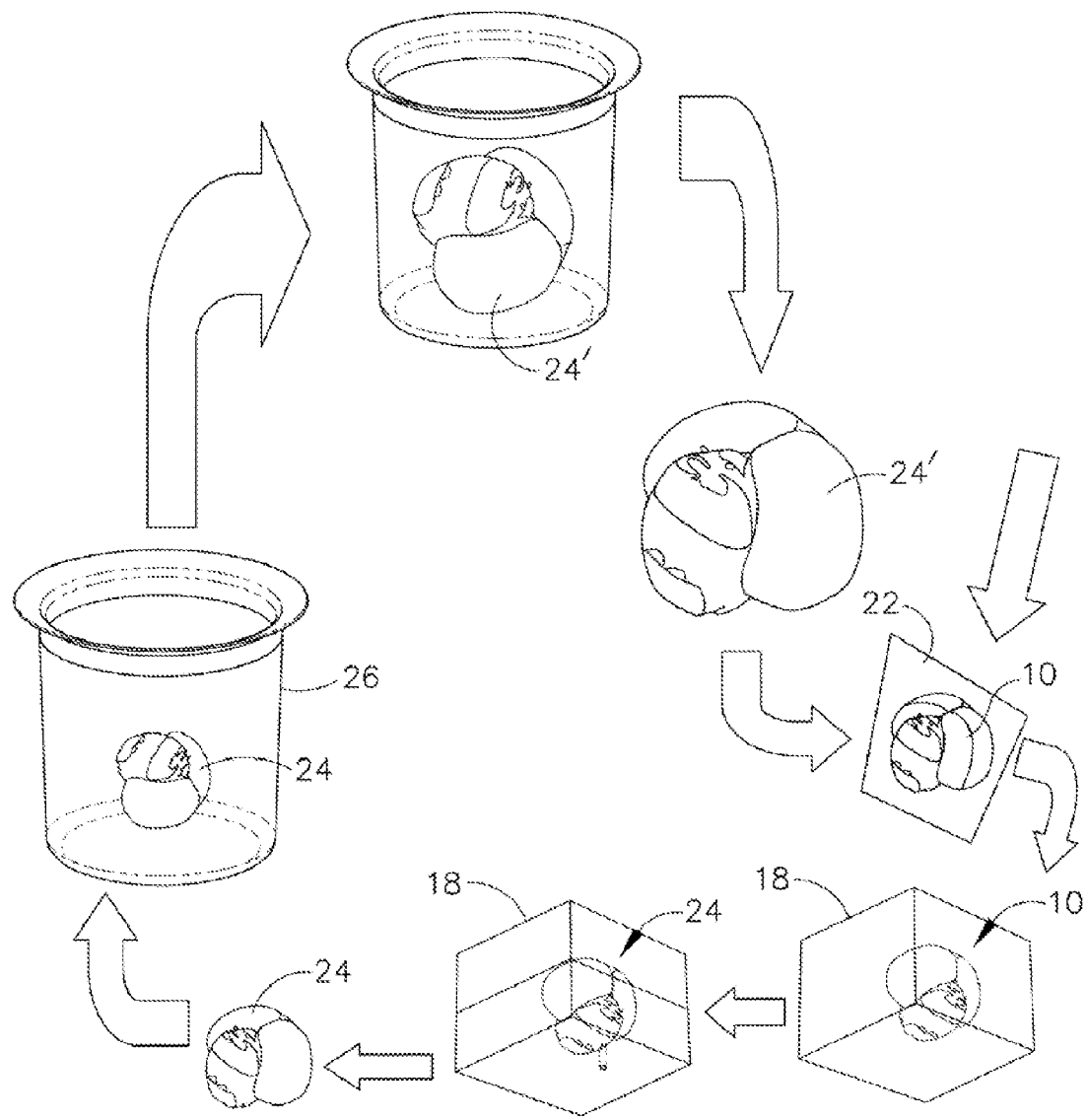
FIG. 10 is a flow diagram representing the iterative process steps for casting, expansion, mold creation and recasting.

FIG. 10 demonstrates the iterative process cycle for scaling of the cast features to the desired size. An original model such as the fly eye 10 is employed to crate an initial mold 18. The mold is separated in to mold halves 18a and 19b for removal of the initial model and reassembled for injection of expandable polymer through fill port 20. Removal of the mold provides the cast 24 which is then inserted into an expansion vessel 26 to which expanding solvent is added resulting in the expansion of the casting. The expanded casting 26' then provides the basis for creating a next level mold for the next iteration of the expansion process.

Figure 11:
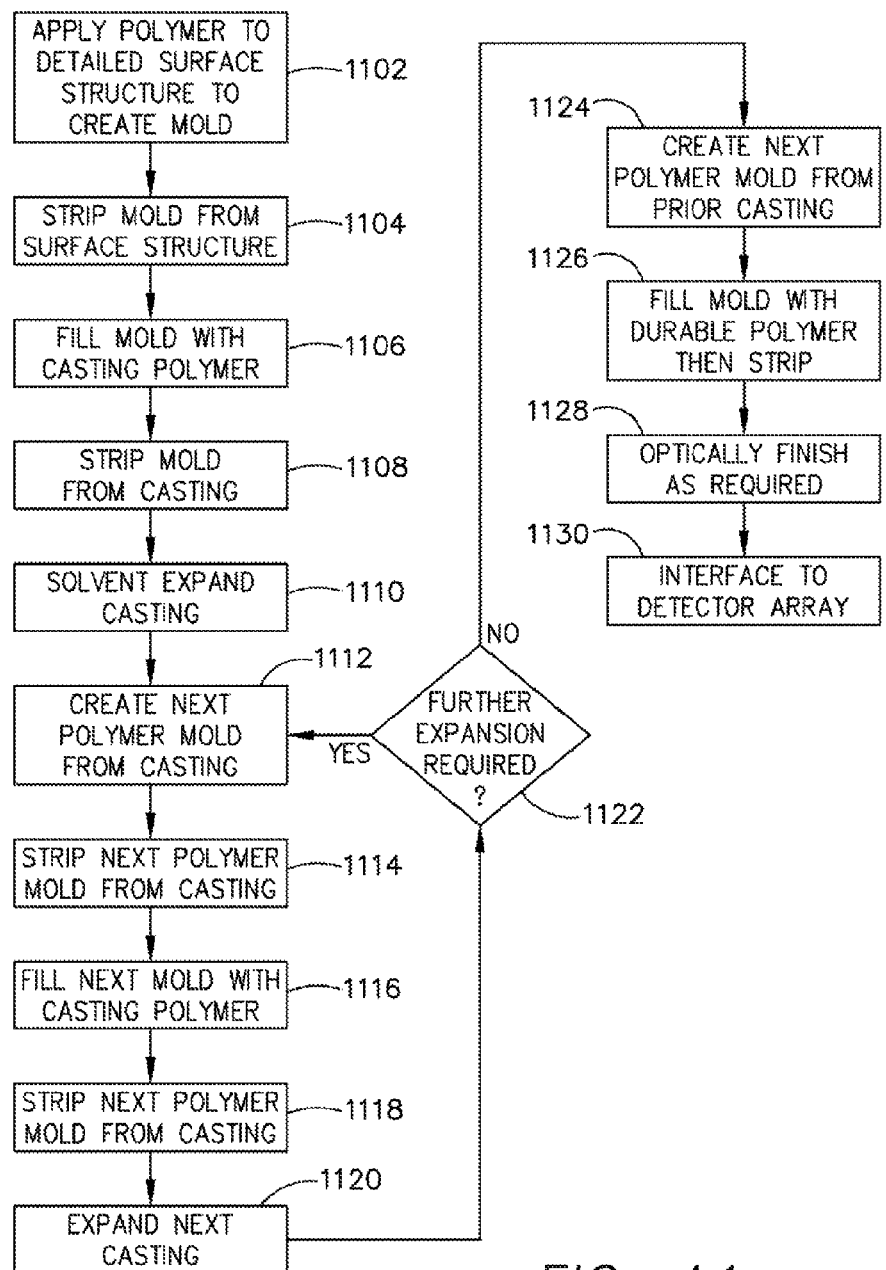
FIG. 11 is a flow chart of the method steps for embodiments of the disclosure; and, FIG. 12 is an illustration of the resulting multiple parallax compound lens optical element.

Referring to FIG. 11, the mold 18 as shown in FIG. 7, is taken by applying a polymer (perfluoronated polyether (PFPE) for the example shown,) step 1102, to the eye which is then peeled off, step 1104, to use for casting. FIG. 5 shows an exemplary interior surface of the completed mold. A casting operation, step 1106, in which mold 18 is filled with a scaling polymer. Polydimethylsiloxane (PDMS) for the embodiment shown, and then stripped, step 1108, results in a cast 24 of the eye shown in FIG. 6. The casting is then expanded using a solvent, step 1110, to swell the polymer cast. As an example, the casting should be exposed to the solvent in controlled amounts and limited times to absorb fluid sufficient to swell the eye casting or other casting to the desired size once solvent concentration gradients in the casting have disappeared. This may necessitate removing the casting from the solvent and their placements in a neutral solution (polar solvents like water, methanol or glycerol) while the solvent gradients equilibrate. Solvents must be selected based on the polymer to be swelled. For the exemplary embodiment herein employing PDMS, to retain precision during incremental isotropic swelling, acetone, pyridine and 1-propanol are employed as swelling solvents. Diisopropylamine, chloroform, Tetrahydrofuran and Ether swell PDMS to a larger extent and are used in alternative embodiments of the method if swelling is controlled as described above.

A second mold is then created, step 1112, by applying PFPE to the swollen first cast. The second mold is then removed, step 1114 form the swollen first cast. The PEPE polymer has very low surface activation energy and readily separates from the PDMS castings preserving features that are a fraction of a micron. A requirement for successful scaling is that the two polymers in question, one for making the mold and another (here, PDMS,) swellable one for making casting, be incompatible enough to facilitate separation with high fidelity of features on the casting. A second PDMS cast is then made using the second mold, step 1116. The second cast is removed from the mold, step 1118 and expanded using the solvent, step 1120. If additional size is required 1122, this process is repeated to create a third mold and third casting and so on until a desired size is obtained. The final casting process, steps 1124 through 1126 employs a durable polymer with desired optical properties to provide a complete scaled compound lens system with multiple parallax for integration with a conformal detector array. In various embodiments as disclosed herein. Lexan and polycarbonate my be employed for the final durable casting material. After the mold is stripped, individual ommitidia can be polished during the process of creating a durable production master mold form the optically finished item in step 1128. Interfacing with a detector array is then accomplished step 1130.

While described for the exemplary embodiment as a three expansion process, additional expansion steps may be employed in alternative embodiments to assure linearity of the expansion, to maintain integrity of the details being scaled or to create even larger expansion for the ultimate cast lens system. Additionally, PFPE and PDMS polymers are employed in the disclosed embodiments, however alternative polymers having compatible properties for mold creation and strippable casting are employed in alternative embodiments.

Figure 12:
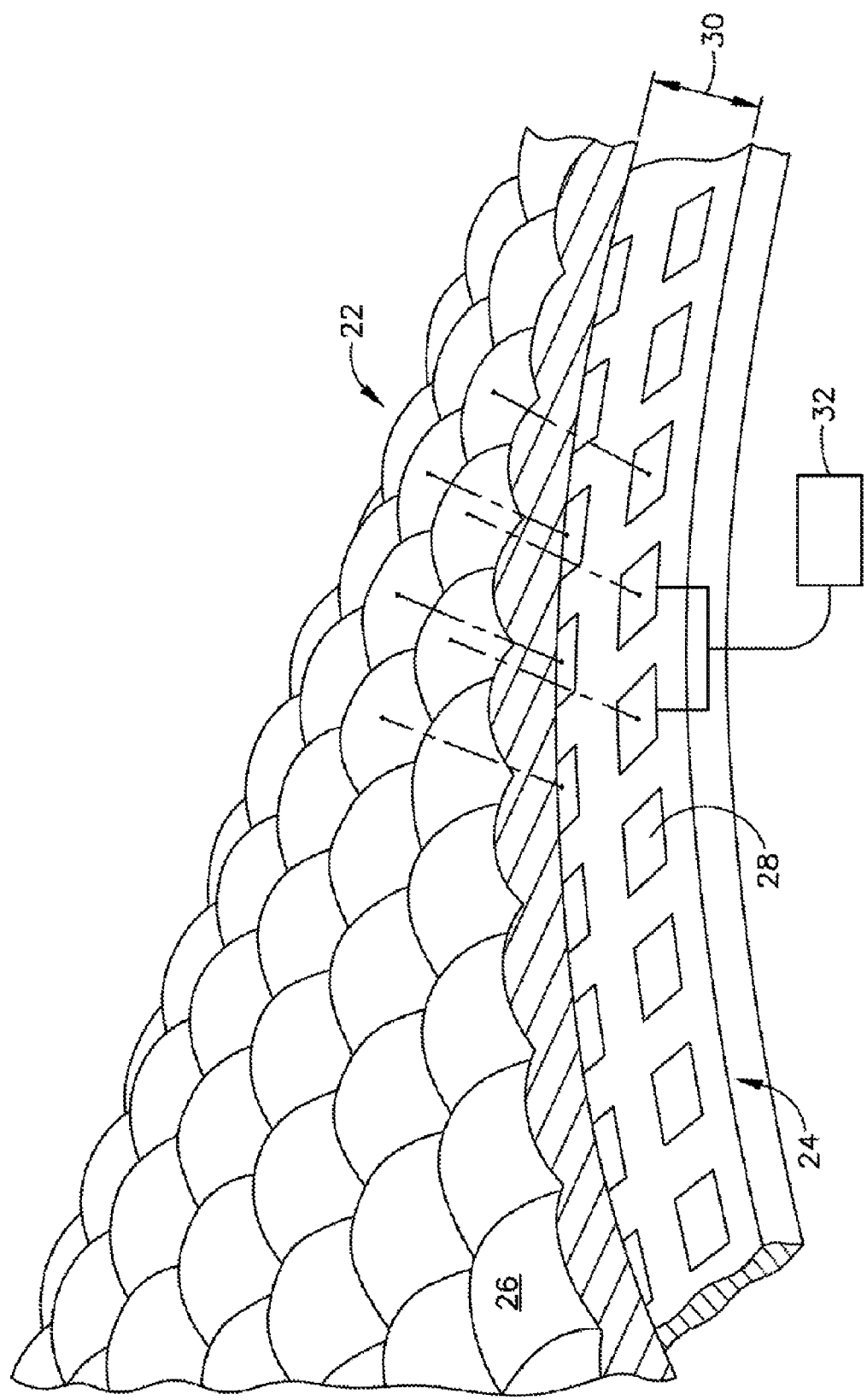

A completed compound lens 22 as produced by the method disclosed herein is shown schematically in FIG. 12 connected to a conformal detector array 24 which provides a highly efficient multiple parallax vision system. Individual lenses 26 in the compound lens are correlated with individual detectors 28 in the array. The array is spaced from the compound lens by a distance 30 for cross image shielding to avoid image bleed over between individual lenses in the compound lens. The detectors in the array are connected to a processor 32, shown schematically in FIG. 12. for data collection and manipulation.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A method for size scaling of surface features comprising the steps of:
   creating a mold of a set of surface features;
   creating a casting of the surface feature set using the mold, wherein the casting is a solvent expandable polymer;
   expanding the casting by a factor of at least three by exposure to a solvent.

2. A method as defined in claim 1 wherein the casting is created with Polydimethylsiloxane (PDMS).

3. A method as defined in claim 1 wherein the mold is created with perfluoronated polyether (PFPE).

4. A method as defined in claim 1 wherein the solvent is selected from the set of acetone, pyridine and 1-propanol.

5. A method as defined in claim 1 further comprising the additional steps of:
   creating a second mold of the expanded casting;
   creating a second casting using the second mold; and
   expanding the second casting by a factor of at least 3.

6. A method as defined in claim 5 wherein the additional steps are conducted for a third time to produce a third casting.

7. A method as defined in claim 6 wherein the third casting employs polycarbonate.

8. A method as defined in claim 1 further comprising the steps of
   exposing the casting to the solvent in controlled amounts and for limited times to absorb fluid sufficient to swell the casting to the desired size once solvent concentration gradients in the casting have disappeared.

9. A method as defined in claim 8 wherein the step of exposing the casting to the solvent further comprises the steps of:
   removing the casting from the solvent;
   placing the casting in a neutral solution while the solvent gradients equilibrate.

10. A method as defined in claim 9 wherein the step of placing the casting in a neutral solvent comprises placing the casting in a selected one of the set of water, methanol or glycerol.

11. A method as defined in claim 8 wherein the solvent is selected from the set of Diisopropylamine, chloroform, Tetrahydrofuran or Ether.

12. A replica casting having expanded size features comprising:
   a casting formed from a polymer mold created from a solvent expanded polymer casting drawn from a primary mold of an original feature set.

13. A replica casting as defined in 12 wherein the polymer mold is PFPE.

14. A replica casting as defined in claim 13 wherein the solvent expanded polymer casting is PDMS.

15. A replica casting as defined in claim 12 wherein the casting is Polycarbonate.

* * * * *